US012577435B2

(12) United States Patent
    Leermann

(10) Patent No.:     US 12,577,435 B2
(45) Date of Patent:       Mar. 17, 2026

(54) ADHESIVE TAPE

(71) Applicant: CERTOPLAST TECHNISCHE KLEBEBÄNDER GMBH, Wuppertal (DE)

(72) Inventor: Timo Leermann, Wuppertal (DE)

(73) Assignee: CERTOPLAST TECHNISCHE KLEBEBAENDER GMBH, Wuppertal (DE)

( * ) Notice: Subject to any disclaimer, the term of this patent is extended or adjusted under 35 U.S.C. 154(b) by 845 days.

(21) Appl. No.: 16/976,887

(22) PCT Filed: Feb. 27, 2019

(86) PCT No.: PCT/EP2019/054881
    § 371 (c)(1),
    (2) Date: Sep. 3, 2020

(87) PCT Pub. No.: WO2019/179738
    PCT Pub. Date: Sep. 26, 2019

(65) Prior Publication Data
    US 2021/0040352 A1     Feb. 11, 2021

(30) Foreign Application Priority Data
    Mar. 23, 2018     (DE) ..................... 20 2018 101 649.0

(51) Int. Cl.
    | | |
    |---|---|
    | *C09J 7/21* | (2018.01) |
    | *C08K 5/00* | (2006.01) |
    | *C09J 133/08* | (2006.01) |
    | *D01F 1/04* | (2006.01) |
    | *D01F 6/04* | (2006.01) |
    | *D01F 6/06* | (2006.01) |
    | *D01F 6/60* | (2006.01) |
    | *D01F 6/62* | (2006.01) |
    | *D06N 3/00* | (2006.01) |

(52) U.S. Cl.
    CPC .............. *C09J 7/21* (2018.01); *C09J 133/08* (2013.01); *D01F 1/04* (2013.01); *D01F 6/04* (2013.01); *D01F 6/06* (2013.01); *D01F 6/60* (2013.01); *D01F 6/62* (2013.01); *D06N 3/0002* (2013.01); *C08K 5/0041* (2013.01); *C09J 2203/302* (2013.01); *C09J 2301/41*

(2020.08); *C09J 2400/263* (2013.01); *C09J 2423/046* (2013.01); *C09J 2423/106* (2013.01); *C09J 2433/00* (2013.01); *C09J 2467/006* (2013.01); *C09J 2477/006* (2013.01); *D06N 2201/0254* (2013.01); *D06N 2201/0263* (2013.01); *D06N 2209/0807* (2013.01)

(58) Field of Classification Search
    CPC ........ C09J 7/21; C09J 133/08; C09J 2301/41; C09J 2203/302; C09J 2400/263; C09J 2423/046; C09J 2423/106; C09J 2433/00; C09J 2467/006; C09J 2477/006; D01F 6/04; D01F 6/06; D01F 6/60; D01F 6/62; D06N 3/0002; D06N 2201/0254; D06N 2201/0263; D06N 2209/0807; C08K 5/0041
    USPC .............................................. 442/59, 60.149
    See application file for complete search history.

(56) References Cited

U.S. PATENT DOCUMENTS

| | | | |
|---|---|---|---|
| 4,141,881 A | 2/1979 | Baebler | |
| 9,695,339 B2 | 7/2017 | Auktun | |
| 2004/0253889 A1 | 12/2004 | Mundt | |
| 2013/0017746 A1* | 1/2013 | Auktun | C09J 7/21 |
| | | | 8/675 |
| 2016/0272786 A1* | 9/2016 | Müssig | C08K 5/29 |
| 2017/0169916 A1* | 6/2017 | Frigge | C09J 7/205 |
| 2019/0085153 A1 | 3/2019 | Muessig | |

FOREIGN PATENT DOCUMENTS

| | | | |
|---|---|---|---|
| DE | 202017107156 | * | 12/2017 |
| DE | 202017107156 U | | 1/2018 |
| GB | 1102087 A | * | 2/1968 |

* cited by examiner

*Primary Examiner* — Camie S Thompson
(74) *Attorney, Agent, or Firm* — Andrew Wilford

(57) ABSTRACT

The subject matter of the invention is an adhesive tape, in particular a wrapping tape for sheathing cables in automobiles. The adhesive tape is equipped with a textile support and at least one adhesive layer applied to one or both sides of the support. The support is coloured by an organic dye which is composed of yellow and red pigments. The yellow pigments are based on anthraquinone. According to the invention, pigments based on perylene are used as red pigments.

6 Claims, No Drawings

ADHESIVE TAPE

CROSS REFERENCE TO RELATED APPLICATIONS

This application is the US-national stage of PCT application PCT/EP2019/054881 filed 27 Feb. 2019 and claiming the priority of German patent application 202018101649.0 itself filed 23 Mar. 2018.

The invention relates to an adhesive tape, in particular tape for wrapping cables in automobiles, comprising a textile substrate band and at least one adhesive layer applied to one or both faces of the substrate band, the substrate band being dyed by an organic dye composed of yellow and red pigments, the yellow pigments being based on anthraquinone.

Textile substrate bands for adhesive tapes have been dyed for years, initially using for example inorganic pigments based on carbon black. Such pigments are for example introduced into an extrudate and can be used in the manufacture of filaments or even filament textiles, as described in detail in WO 2003/033611 [US 2004/0253889].

Nowadays, however, it is increasingly important for the dying to have a protective or warning function for the correspondingly equipped adhesive tape. In fact, such adhesive tapes and in particular wrapping tapes are normally used to make cable harnesses. For this purpose, the adhesive tapes are typically wound as a spiral or helix around the cable bundle to bundle the electrical cables to be combined before installation or when installed. In principle, longitudinal jackets can also be formed in this way.

The warning or notification function of the adhesive tape or wrapping tape in question is required and necessary, for example, for cables or cable bundles carrying more voltages greater than 60 volts are applied. This is typically the case with hybrid and electric cars. Such cable bundles must be identified by an orange color. In this context, RAL 2003 (pastel orange) was specified in 2010 as the standard color.

Various approaches to equip adhesive tapes and, in particular, tapes for wrapping cables in automobiles with the above-described orange color are already known from the prior art. For example, the generic teaching according to DE 10 2011 079 114 [U.S. Pat. No. 9,695,339] works with organic dyes that are composed of a mixture of yellow and red dyes or pigments. The yellow dye is based on anthraquinone. An azo compound is used for the red dye. However, as an alternative, the red dye can also be a mixture of anthraquinone compounds and azo compounds.

The dyeing of the filaments, filaments or yarns of the textile substrate band in the teaching according to DE 10 2011 079 114 is done by dispersion dyeing. In this process, synthetic colorants that are limitedly soluble in water are used. For this purpose, the colorant must be finely ground and dissolved a heated dye bath.

As usual, the term "dye" in the context of the present patent application and according to the explanations in "Römpp Chemielexikon, 9th edition, 1993, page 1301" is a collective term or designation for colorants soluble in solvents and/or binders. The dyes are thus contrasted with insoluble pigments that are inferior to the in terms of number, structural diversity and usually also luminosity.

Consequently, pigments are to be understood below and according to the explanations in "Römpp Chemielexikon 9th Edition, 1995, page 3439", as inorganic or organic colorants, whether colored or achromatic, that are practically insoluble in the application medium. Accordingly, in accordance with these definitions, a distinction must be made in the following between dyes on the one hand and pigments on the other hand.

In the case of the known teaching according to DE 10 2011 079 114, discoloration or fading of the coloring of the adhesive tape can still occur due to heat exposure and/or signs of ageing. This is particularly problematic on long time scales because in combination with unavoidable contamination, the warning effect is lost.

For this reason, DE 20 2017 107 156 of applicant proposes to use an adhesive tape for which wholly or partially inorganic mineral pigments are used as the dye. As an overall result, a temperature stability is achieved that generally lies well above 150° C. for the adhesive tape, taking into account the associated temperature class T4 in accordance with standard LV 312 ("Protection systems for wire harnesses in motor vehicles, adhesive tapes; test guideline" (10/2009)), over a period of 3000 hours.

DE 10 2015 121 562 [US 2017/0169916] follows a different approach. Here, a colorant based on a diazo compound is used. In this way, another attempt is made to once again achieve a particular temperature resistance that covers at least temperature class T4 in the present case. All this is to be achieved, among other things, by dispensing with anthraquinone compounds because anthraquinone is classified as a supposedly hazardous substance. However, possible evidence for this is not mentioned.

The object of the invention is to provide an adhesive tape and in particular a tape for wrapping cables in automobiles that is particularly temperature stable and at the same time is constructed in a simple and inexpensive manner.

In order to attain this object, an adhesive tape according to the invention is characterized within the scope of the invention in that perylene-based pigments are used as red pigments.

Thus, for the organic dye, the invention first of all makes use of yellow pigments for the implementation of the organic dye that are still based on anthraquinone, as is known for example from DE 10 2011 079 114. In contrast, however, an azo compound or a mixture of an anthraquinone compound and an azo compound is not used as the red dye or red pigment. Rather, the present invention deliberately makes use of a perylene, thus a special polycyclic aromatic hydrocarbon that for example occurs naturally in peat and recent sediments at the bottom of water bodies, but also in crude oil. Moreover, perylene can be made by heating naphthalene with aluminum chloride or other Lewis acids. Furthermore, the decarboxylation of perylenetetracarboxylic dianhydride (PTCDA) is known to be used for the production of perylene. This is usually carried out by microwaves in the presence of copper as a catalyst.

Perylene is a solid and is characterized by yellow and shiny platelets that have an extremely high-melting temperature of higher than 270° C. Since perylene is also an organic semiconductor, perylene and its derivatives are increasingly available as pigments at a falling raw material price. This can be attributed to the fact that perylene is becoming increasingly widespread as a high-purity material in organic components such as transistors, organic light-emitting diodes (OLED) or organic solar cells.

In this way, according to the invention, an adhesive tape is provided in particular tape for wrapping cables in automobiles that can be made in a simple and cost-effective manner. In addition, the adhesive tape in question is designed to be extremely temperature-stable and discoloration is not or virtually not observed. In fact, the adhesive tape according to the invention at least complies with the temperature class T3 (125° C.) and, in particular, even with temperature class T4 (150° C.) in accordance with the standard LV 312 referred to above. Temperature class T3 corresponds to the fact that the adhesive tape in question must be resistant to temperatures of up to 125° C. In order to comply with temperature class T4, resistance up to 150° C. is required. Temperature class T5 even requires up to 175° C. This means that the wrapped cable and with it the adhesive tape must withstand this temperature for a period of 3000 hours and may not exhibit any significant discoloration. Details on this are described in the standard in question or in above-cited DE 10 2015 121 562.

The yellow dye is based according to the invention on yellow pigments based on anthraquinone. Anthraquinone or corresponding pigments are those derived from the basic structure of anthraquinone. Such perylene pigments as well as anthraquinone pigments are available in a variety of forms and at low cost and are therefore particularly suitable for the intended use according to the invention. In addition, it is hereby possible as described to achieve particularly high temperature stability.

In order to be able to attain the temperature class T3 already mentioned and in particular even T4 for the adhesive tape, a special adhesive layer is generally used. In this case, it has proven to be advantageous if the adhesive layer consists wholly or partially of a solvent-free acrylic hot-melt compound. In principle, other adhesive coatings are of course also conceivable. However, in order to achieve the required temperature class of at least T4, an acrylate hot-melt compound is generally used.

Apart from that, the work is carried out in such a way that individual or all yarns of the substrate band are dyed and in particular spinneret-dyed. As a result, by also using an acrylic-based adhesive compound, an adhesive tape with a colored substrate band that at least complies with the temperature class T3 already mentioned above and, in particular, even with temperature class T4 can be provided for wrapping cable bundles. This is also and in particular due to the fact that the individual or all yarns are spinneret-dyed.

This type of spinneret dyeing is characterized in that the colored pigments or the mixture of yellow and red pigments is mixed with granules of, for example, polyester. The pigments generally have a particle size of less than 0.5 mm. Moreover, it has proved advantageous in this context if the pigments are present in the extrudate during spinneret dyeing in a concentration of 0.2 to 3.0 percent by weight based on the polymer spinning mass.

It is principally possible that not only spun yarns can be made and further processed as yarns for the textile substrate band in the course of the spinneret dyeing already described above. In fact, the spun filaments can be further processed into yarns or even staple filaments. As suitable substrate bands, both woven and nonwoven textiles or a combination thereof can be used. The basis weight of the substrate band is usually 20 g/m² up to 500 g/m². An application weight of 20 g/m² to 200 g/m² is generally recommended for the adhesive. The adhesive layer can be applied to the substrate over the entire surface or in the form of strips.

Producing the tape wrap with the help of the adhesive tape according to the invention can be achieved in that the adhesive tape in question is fed in a spiral or helix as a wrapping tape around the electrical cables to be wrapped. However, it is also possible that with the help of the adhesive tape or wrapping tape according to the invention, a longitudinal jacket is created that is wrapped around the cables as a longitudinal envelope extending longitudinally.

The substrate band can be made and constructed wholly or partially of polyester filaments, polypropylene filaments, polyethylene filaments or polyamide filaments. The filaments can be further processed into spun yarns or even staple filaments. Thereby, the already mentioned substrate bands can be made that are formed as knitted or woven textile or nonwoven or a combination thereof. In combination with the preferably employed spinneret dyeing of the filaments and by using the special pigments according to the invention, a particularly temperature-stable adhesive tape is obtained.

If, in addition, filaments based on polyester or polyamide are used, high abrasion resistances are also observed that, for example when using a textile as a substrate band, correspond or can correspond to abrasion resistances that according to the previously mentioned standard LV 312 correspond to an average abrasion protection according to class C or even a high abrasion protection according to class D. Due to the two pigments used according to the invention, the orange color shade according to RAL 2003 (pastel orange) can be created as desired. This is where the main advantages can be seen.

The invention claimed is:

1. An adhesive tape for wrapping cables in automobiles, the tape comprising:

a textile substrate band formed at least partially of polyester or polyamide filaments and an organic dye coloring the filaments of the substrate band and composed of a mixture of yellow pigment based on anthraquinone and red perylene particles of a particle size less than 0.5 mm and in a percent by mass of the filaments of 0.2% to 3.0%, the band having a temperature resistance that covers at least temperature class T4 and an abrasion resistance according to class C or D of standard LV 312; and an adhesive layer applied to one or both faces of the substrate band and having a temperature resistance that covers at least temperature class T4; and an organic dye coloring the filaments of the substrate band and composed of a mixture of yellow pigment based on anthraquinone and red perylene particles of a particle size less than 0.5 mm, having a temperature resistance that covers at least temperature class T4, and in a percent by mass of the filaments of 0.2% to 3.0%, whereby the tape has a temperature resistance that covers at least temperature class T4.

2. The adhesive tape according to claim 1, wherein the substrate band is formed as a textile or nonwoven or combination thereof.

3. The adhesive tape according to claim 1, wherein the substrate band has a basis weight of up to 500 g/m² and the adhesive has an application weight of 20 to 200 g/m².

4. The adhesive tape according to claim 1, wherein individual or all of the yarns of the substrate band are spinneret-dyed.

5. The adhesive tape according to claim 1, wherein the adhesive layer consists wholly or partially of a solvent-free acrylate hot-melt composition.

6. An adhesive tape for wrapping cables in automobiles, the tape comprising:

a textile substrate band at least partially consisting of polyester or polyamide filaments and having an organic dye coloring the filaments of the substrate band and composed of a mixture of yellow pigment based on anthraquinone and red perylene particles of a particle size less than 0.5 mm and in a percent by mass of the filaments of 0.2% to 3.0%, the band also having a temperature resistance that covers at least temperature class T4 and an abrasion resistance according to class C or D of standard LV 312; and an adhesive layer applied to one or both faces of the substrate band, the band and adhesive complying at least with temperature class T4 according to standard LV 312, whereby; and an adhesive layer applied to one or both faces of the substrate band; and an organic dye coloring the filaments of the substrate band and composed of a mixture of yellow pigment based on anthraquinone and red perylene particles of a particle size less than 0.5 mm and in a percent by mass of the filaments of 0.2% to 3.0%, the layer and the dye having a temperature resistance that covers at least temperature class T4 such that the tape also has a temperature resistance that covers at least temperature class T4.

\* \* \* \* \*